US012369112B2

(12) United States Patent
Gomes Da Silva et al.

(10) Patent No.: US 12,369,112 B2
(45) Date of Patent: Jul. 22, 2025

(54) NETWORK SLICE INTERNAL MAPPING USING UNSUPERVISED LEARNING AND RELATED APPARATUSES

(71) Applicant: Telefonaktiebolaget LM Ericsson (publ), Stockholm (SE)

(72) Inventors: Pedro Henrique Gomes Da Silva, Sao Paulo SP (BR); Mateus Santos, Sao Paulo (BR); Ricardo Souza, Indaiatuba (BR); Rafia Inam, Västerås (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 464 days.

(21) Appl. No.: 17/912,984

(22) PCT Filed: Mar. 27, 2020

(86) PCT No.: PCT/SE2020/050319
§ 371 (c)(1),
(2) Date: Sep. 20, 2022

(87) PCT Pub. No.: WO2021/194400
PCT Pub. Date: Sep. 30, 2021

(65) Prior Publication Data
US 2023/0180115 A1    Jun. 8, 2023

(51) Int. Cl.
*H04W 8/18*      (2009.01)
*H04W 48/18*     (2009.01)

(52) U.S. Cl.
CPC ............ *H04W 48/18* (2013.01); *H04W 8/18* (2013.01)

(58) Field of Classification Search
CPC ........ H04W 48/18; H04W 8/18; H04W 24/02
See application file for complete search history.

(56) References Cited

U.S. PATENT DOCUMENTS

| | | | |
|---|---|---|---|
| 10,362,527 B2* | 7/2019 | Carames | ............... H04W 48/02 |
| 2017/0048710 A1* | 2/2017 | Agarwal | ............. H04L 63/0884 |
| 2017/0257886 A1* | 9/2017 | Adjakple | ............. H04W 74/04 |
| 2018/0359337 A1* | 12/2018 | Kodaypak | ............... H04L 67/52 |
| 2020/0053834 A1 | 2/2020 | Dahan et al. | |
| 2022/0353151 A1* | 11/2022 | Yu | ........................ H04L 41/0806 |
| 2024/0373401 A1* | 11/2024 | Chun | ..................... H04W 68/02 |

(Continued)

FOREIGN PATENT DOCUMENTS

| | | |
|---|---|---|
| CN | 110461027 A | 11/2019 |
| EP | 3512233 A1 | 7/2019 |

(Continued)

OTHER PUBLICATIONS

International Search Report and Written Opinion of the International Searching Authority for PCT International Application No. PCT/SE2020/050319 dated Feb. 4, 2021.

(Continued)

Primary Examiner — Julio R Perez
(74) Attorney, Agent, or Firm — Sage Patent Group

(57) ABSTRACT

A method performed by a first network node for a telecommunications network is provided. The method includes receiving a request for a network service. The method further includes dynamically mapping the request for the network service to an internal network slice instance based on unsupervised learning of historical data.

17 Claims, 7 Drawing Sheets

(56) References Cited

U.S. PATENT DOCUMENTS

2025/0036482 A1* 1/2025 Barton ............... H04L 41/0833

FOREIGN PATENT DOCUMENTS

| WO | 2018176391 A1 | 10/2018 |
| WO | 2020052605 A1 | 3/2020 |

OTHER PUBLICATIONS

3GPP TR 28.801 V15.1.0, 3rd Generation Partnership Project; Technical Specification Group Services and System Aspects; Telecommunication management; Study on management and orchestration of network slicing for next generation network (Release 15), Jan. 2018, 75 pages.

Communication regarding extended European Search Report for European Patent Application No. 20926673.3 mailed Nov. 7, 2023, 7 pages.

* cited by examiner

Figure 3

| NETWORK SERVICE A | | | | | EXTERNAL NETWORK SLICE INSTANCE | EXTERNAL NETWORK SLICE TYPE | INTERNAL NETWORK SLICE INSTANCE | INTERNAL NETWORK SLICE TYPE |
|---|---|---|---|---|---|---|---|---|
| SLS1 | SLS2 | SLS3 | UE TYPE | REGION | | | | |
| MAX DELAY : 10MS | MIN THROUGHPUT: 1 MBPS | MAX JITTER : 1MS | FACTORY ROBOT | EAST COAST USA | X | URLLC | X1* | FACTORY-URLLC1 |
| MAX DELAY : 15MS | MIN THROUGHPUT: 1 MBPS | MAX JITTER : 4MS | FACTORY ROBOT | WEST COAST USA | X | URLLC | X2* | FACTORY-URLLC2 |

NETWORK SLICE INTERNAL MAPPING USING UNSUPERVISED LEARNING AND RELATED APPARATUSES

CROSS REFERENCE TO RELATED APPLICATION

This application is a 35 U.S.C. § 371 national stage application of PCT International Application No. PCT/SE2020/050319 filed on Mar. 27, 2020, the disclosure and content of which is incorporated by reference herein in its entirety.

TECHNICAL FIELD

The present disclosure relates generally to telecommunications networks and, more particularly, to network slice internal mapping and related apparatuses.

BACKGROUND 5G networks introduced the concept of network slices. According to the specification 3GPP TS 23.501 v.16.3, a network slice is a "logical network that provides specific network capabilities and network characteristics". One of the goals of network slices is to provide Quality of Service (QoS) guarantees regarding network requirements (e.g., latency, throughput, reliability, security, etc.) as agreed in a Service Level Agreement (SLA) with a customer. A User Equipment (UE) in a 5G network can be associated to one or more network slices. A Protocol Data Unit (PDU) session must be established before a UE can exchange data with any data network and every PDU session is associated to one and only one network slice instance at a time. In this way, a network slice serves as a private network from UE's perspective. Each PDU session that a UE establishes has one (or more) application(s) associated, with different network requirements such as low latency, high throughput, low jitter, etc.

Network slice management is currently under specification in the 3GPP according to the TR 28.801. As of Release 15, a UE can be served by at most eight network slice instances at a time. These slices may be of different types: standardized ones that would be directly mapped to enhanced mobile broadband (eMBB), ultra-reliable low-latency communication (URLLC), massive IoT (mIoT), critical Machine Type Communication (cMTC), etc. use cases, as well as non-standardized ones, which may be defined by communication service providers (CSPs).

SUMMARY

In various embodiments of the present disclosure, a method performed by a first network node for a telecommunications network is provided. The method includes receiving a request for a network service. The method further includes dynamically mapping the request for the network service to an internal network slice instance based on unsupervised learning of historical data.

In some embodiments, further operations performed by the first network node include selecting the internal network slice instance.

In some embodiments, further operations performed by the first network node include translating the internal network slice instance into an external network slice instance. The translating hides the internal slice instance from external exposure.

In some embodiments, further operations performed by the first network node include signalling the external network slice instance to a second network node in the telecommunications network.

Corresponding embodiments of inventive concepts for a first network node, computer products, and computer programs are also provided.

In some approaches, only a limited number of network slice types are specified, but a larger number of network slice types may be needed. Additionally, in some approaches, management of network slices may be differentiated between "network slices as a service" (NSaaS) and "network slice as network operator (NOP) internal", which may bring complexity to the system. Additionally, network slice types associated with each communication device may be announced by a 5G management system. Network slices, however, may be a business differentiator, such that some abstraction that allows hiding the internal details may be desired.

Various embodiments of the present disclosure may provide solutions to these and other potential problems. In various embodiments of the present disclosure, a request for a network service may be dynamically mapped to an internal network slice instance based on unsupervised learning of historical data. As a consequence, a limited number of network slices may be exposed and, internally refined based on historical data. Additionally, the mapping may reduce complexity of the system; and the mapping may be hidden externally.

BRIEF DESCRIPTION OF DRAWINGS

The accompanying drawings, which are included to provide a further understanding of the disclosure and are incorporated in and constitute a part of this application, illustrate certain non-limiting embodiments of inventive concepts. In the drawings:

FIG. 3 is a table illustrating an exemplary entry in a database for network slice management in accordance with various embodiments of the present disclosure;

DETAILED DESCRIPTION

Figure 1:
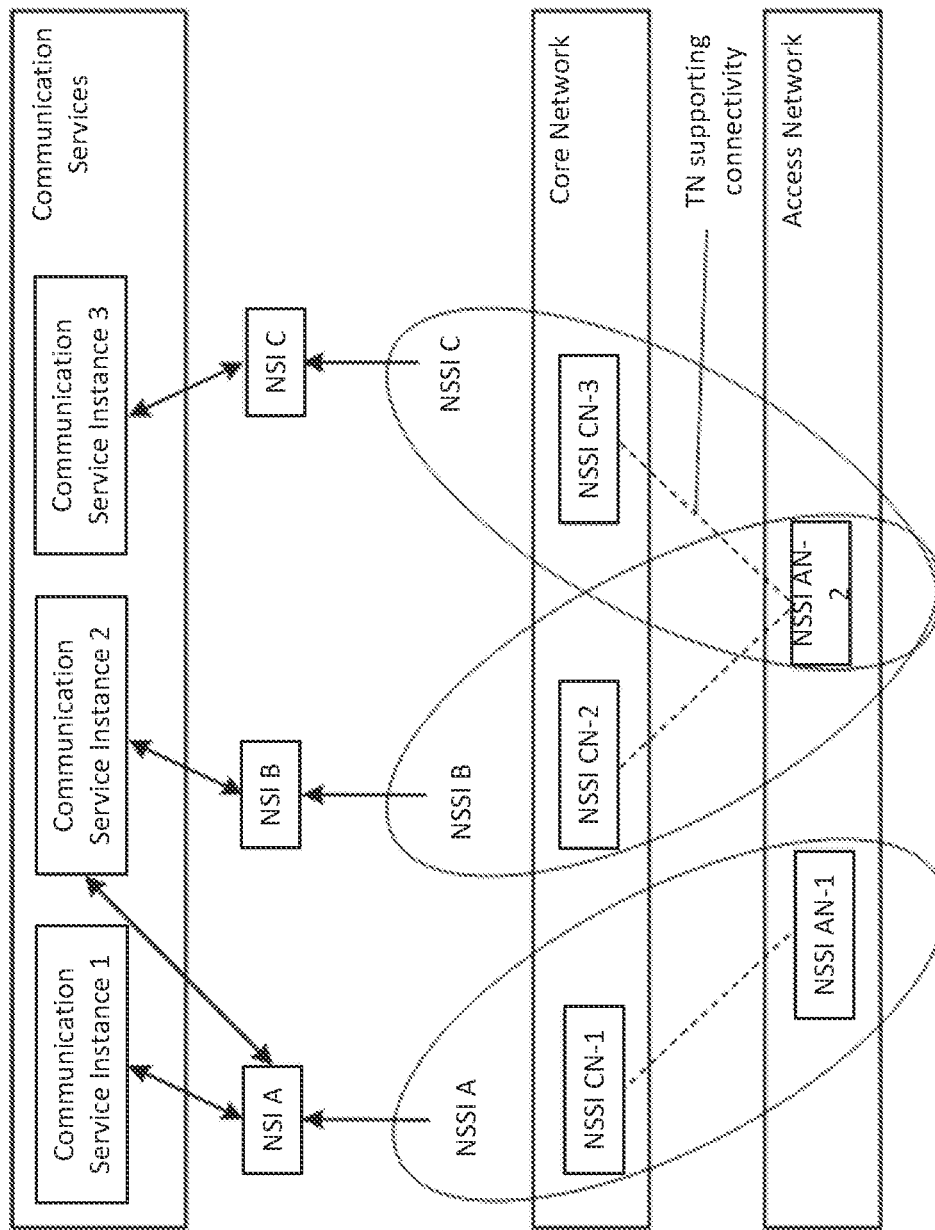
FIG. 1 is a block diagram illustrating management of network slices as described in 3GPP TS 28.801 v15.1, Technical Specification Group Services and System Aspects; Telecommunication management; Study on management and orchestration of network slicing for next generation network (Release 15), www.3gpp.org/DynaReport/SpecVsWi—28801.htm (18 Feb. 2020)

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter. The term "network slice internal recommendation node" is used in a non-limiting manner and, as explained below, can refer to any type of network node between an exposed network slice instance and an internal representation of the network slice. The term "network slice internal recommendation node" herein may be interchangeable and replaced with the term "first network node". As used herein, network node refers to equipment capable, configured, arranged and/or operable to communicate directly or indirectly with a communication device and/or with other network nodes or equipment in the telecommunications network to enable and/or provide network slice internal mapping based on unsupervised learning of historical data. Examples of network nodes include, but are not limited to, a network node positioned between a core network node and a communication service provider, a network slice selection node (NSSF), a virtual network node running in a cloud environment, etc. More generally, however, network nodes may represent any suitable device (or group of devices) capable, configured, arranged, and/or operable to enable and/or provide network slice internal mapping based on unsupervised learning of historical data.

Further, the term "user equipment" (UE) is used in a non-limiting manner and, as explained below, can refer to any type of communication device. As used herein, UE refers to a device capable, configured, arranged and/or operable to communicate wirelessly with network nodes and/or other wireless devices. Unless otherwise noted, the term UE may be used interchangeably herein with user equipment and/or with communication device. Communicating wirelessly may involve transmitting and/or receiving wireless signals using electromagnetic waves, radio waves, infrared waves, and/or other types of signals suitable for conveying information through unguided transmission media. In some embodiments, a UE may be configured to transmit and/or receive information without direct human interaction. For instance, a UE may be designed to transmit information to a network on a predetermined schedule, when triggered by an internal or external event, or in response to requests from the radio communication network. Examples of a UE include, but are not limited to, a smart phone, a mobile phone, a cell phone, a voice over IP (VoIP) phone, a wireless local loop phone, a desktop computer, a personal digital assistant (PDA), a wireless camera, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A UE may support device-to-device (D2D) communication, for example by implementing a 3GPP standard for sidelink communication, and may in this case be referred to as a D2D communication device. As yet another specific example, in an Internet of Things (IoT) scenario, a UE may represent a machine or other device that performs monitoring and/or measurements, and transmits the results of such monitoring and/or measurements to another UE and/or a network node. The UE may in this case be a machine-to-machine (M2M) device, which may in a 3GPP context be referred to as a machine-type communication (MTC) device. As one particular example, the UE may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.), different types of robots in industrial settings/environments or other environments like home, hospitals, etc. In other scenarios, a UE may represent a vehicle or other equipment that is capable of monitoring and/or reporting on its operational status or other functions associated with its operation. A UE as described above may represent the endpoint of a wireless connection, in which case the device may be referred to as a wireless terminal. Furthermore, a UE as described above may be mobile, in which case it may also be referred to as a mobile device or a mobile terminal.

The following explanation of potential problems is a present realization as part of the present disclosure and is not to be construed as previously known by others. Network slicing may be a key enabler for 5G networks as it will allow that different applications with different requirements can co-exist while keeping their respective QoS guarantees. In some approaches, the complexity of network slice management tends to grow drastically as the number of users, applications and the network slice instances increase and the QoS requirements vary from slice to slice.

Additionally, in some approaches, the flexibility of a 5G radio access network (RAN) and softwarization of 5G core may allow a CSP to create new services and business models. This may provide important business differentiation opportunities for CSPs, and may allow CSPs to improve their efficiency and reduce their operational expenditure. Network slices management also may be one way of abstracting complexity of 5G networks and enabling such differentiation to the customers of CSPs. However, such management systems are yet to be created and how efficiently they will work is an open question.

Recommendations from 3GPP standards (especially TR 28.801) provide some approaches for managing and exposing network slices. However, potential problems of these approaches include:

1. Only a limited number of network slice types are specified (four types, although new proprietary types are allowed). Since each application may have very different requirements, a large or very large number of network slice types may be needed depending on the business models of CSPs.
2. The management of network slices is differentiated between "Network slice as a service" and "Network slice as NOP internal", which may bring more complexity to the system. Simplifying the management of network slices may be desired.
3. The network slice types associated with each UE is announced by a 5G management system. Since network slices may be a key business differentiator, some abstraction that allows hiding the internal details may be desired.

Various embodiments of the present disclosure may provide solutions to these and other potential problems. In various embodiments of the present disclosure, a network slicing translation procedure may be provided. One example of a protocol is a NAT (Network Address Translation) protocol, where a limited set of externally visible addresses may be mapped to a larger set of internal addresses. Various embodiments of the present disclosure can map and abstract an internal network slice implementation. Such mapping, however, may need to be fast and dynamic. Dynamic mapping may include, without limitation, recommending different network slices over time based on historical data. For example, a network slice internal recommendation node may allow that network slices types change over time with little involvement of operators. As new requirements and new network slice types are inserted in historical databases, a network slice internal recommendation node can learn and dynamically evolve to adapt to CSP business needs. In various embodiments of the present disclosure, an unsupervised learning technique may leverage historical data and cluster users based on network service requirements (or their associated service level specifications (SLSs)).

Various embodiments of the present disclosure can include mapping overall requirements for communication services coming from consumers (e.g., a UE's applications or other CSP consuming NSaaS) to internal network slice instances. This mapping may be realized with a network slice internal recommendation node that uses unsupervised learning to cluster communication services features (e.g., SLS, consumer type, etc.).

Potential advantages provided by various embodiments of the present disclosure may include solving some issues or inefficiencies from 3GPP network slice management specifications.

For example, in various embodiments of inventive concepts, a fine-grained solution may be provided for differentiated QoS requirements. The communication services provided by CSPs may have very different levels of QoS, even within the same network slice. These different services may be a response to different requirements on the same slice or may be based on the criticality of the services in a slice. For example, within a massive IoT (mIoT) slice, one customer may have a latency requirement of 15 ms, while another customer may need <10 ms. In another example, one customer may need to transfer only temperature sensor data, while another customer may need to send images from a robot at a high throughput rate. This may require a more fine-grained mapping of communication services requirements and the network slices provided by the CSP. In various embodiments of inventive concepts, a CSP can expose a limited set of network slices and, internally, refine them based on knowledge from users, among others.

Additional potential advantages that may be provided by various embodiments of inventive concepts may include managing complexity; and achieving an optimized or improved mapping between communication services and network slices. Managing network slices is expected to be a cumbersome task to operators. Standardization allows two types of management models (NSaaS and Network Slice as NOP internal). Having two different business models may add another layer of complexity to network slices management. In both models, a potential common problem is the need for an optimized or improved mapping between the communication services provided to consumers and the best or appropriate network slice instance that runs within the CSP. In various embodiments of inventive concepts, a common way of mapping the requirements to network slices may be achieved with unsupervised learning.

Additional potential advantages that may be provided by various embodiments of inventive concepts may include that an automated solution may be provided. Applications requirements may change over time and the network slices provided by the CSP also may change accordingly. It may be difficult for CSPs to keep pace without an automated system that can dynamically recommend network slices based on historical data. In various embodiments of inventive concepts, a network slice internal recommendation node may allow that network slices types change over time with little involvement of operators. As new requirements and new network slice types are inserted in historical databases, the network slice internal recommendation node can learn and evolve to adapt to CSP business needs.

Additional potential advantages that may be provided by various embodiments of inventive concepts may include keeping internal mapping details hidden. Since implementation of network slices is proprietary and may bring competitive advantage for the CSPs, it may be desirable to keep the mapping hidden from the consumer's perspective. In this sense, one given CSP can expose to its consumers a set of network slice instances associated with network slice types, that internally are implemented by a more fine-grained set of network slices that would allow more sophisticated management. In various embodiments of inventive concepts, such abstraction may be achieved with an intermediate layer that maps externally visible network slice instances to internal network slice instances.

In some embodiments of the present disclosure, internal network slice instances can be exposed directly to the consumers, or, alternatively, be abstracted into internal network slice instances. This may avoid leaking network slice implementation details from a CSP.

FIG. 1 is a block diagram illustrating management of network slices as described in 3GPP TS 28.801 v15.1. In the network slice management system of FIG. 1, a communication service instance, e.g. Communication Service Instance 2, may be served by two different network slice instances (NSIs), e.g. NSI A and NSI B.

Figure 2:
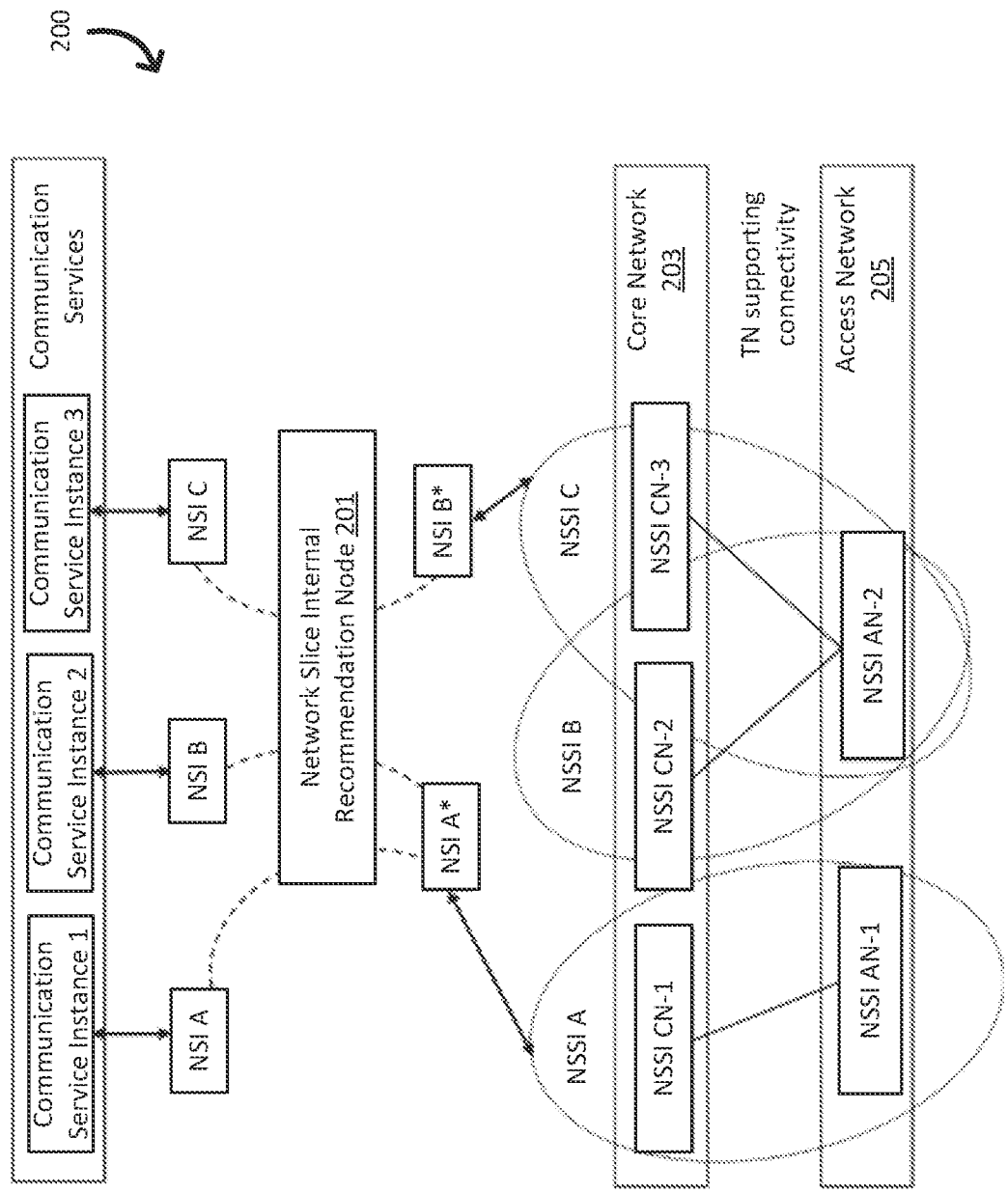
FIG. 2 is a block diagram illustrating network slice management in accordance with various embodiments of the present disclosure.

In various embodiments of the present disclosure, a network slice internal recommendation node may be provided that is an internal system that may sit in between exposed network slice instances and the internal representation. FIG. 2 is a block diagram illustrating network slice management in accordance with various embodiments of the present disclosure. Referring to FIG. 2, in telecommunications network 200, communication services, e.g., Communication Service Instances 1, 2, and 3, may be served by three different network slice instances, e.g., NSI A, NSI B, and NSI C. Network slice internal recommendation node 201 sits between the exposed network slice instances NSI A, NSI B, and NSI C and the internal representations NSI A* and NSI B*, respectively. Core network 203 may include, e.g., three network slice subnet instance core network (NSSI CN) nodes NSSI CN-1, NSSI CN-2, and NSSI CN-3. Core network 203 is communicatively connected to radio access network 205.

Still referring to FIG. 2, in accordance with some embodiments of the present disclosure, the network slice subnet instance NSSI B is not utilized because both NSI A and NSI B are mapped to NSI A*. It is noted, however, that this situation may change in the future as network slice internal recommendation node 201 learns more about the behavior of the communication services.

It is noted that various embodiments of the present disclosure are focused on a time period related to when a UE is associated to a network slice, before data is transmitted via an associated network slice; and not the use of the network slice internal recommendation node in run time.

The network slice internal recommendation node can work on a 5G system based on historical data. Historical data can be made available from a node communicatively connected to the 5G system, for example by a UDM (Unified Data Management) node (e.g., UDM 403 of FIG. 4). While various embodiments of the present disclosure refer to a UDM as providing historical data, the invention is not so limited. Instead, other nodes may provide historical data, including without limitation, the network slice internal recommendation node, any node including a database of historical data that is communicatively connected to the network slice recommendation node, etc. Details of a historical database may be implementation-specific; but the historical database includes, without limitation, previous mappings between network services requests and network slice instances.

FIG. 3 is a table illustrating an exemplary entry in a database for network slice management in accordance with various embodiments of the present disclosure. In the example of FIG. 3, two requests of a Network Service A having different requirements are illustrated. A first request of Network Service A is shown that has three different SLSs (maximum delay of 10 ms, minimum throughput of 1 Mbps, maximum jitter of 1 ms), together with the type of UE (factory robot) and region (East Coast USA). The first request of Network Service A of region East Coast USA was mapped to an external Network Slice Instance X of type 'URLLC', which itself was associated with an internal Network Slice Instance X1* of type 'factory-URLLC1'. For the second request of Network Service A, the SLS of the West Coast USA region slice (maximum delay of 15 ms, minimum throughput of 1 Mbps, maximum jitter of 4 ms) are different than the slice of the East Coast USA region. Thus, the second request was mapped to an internal Network Slice Instance X2* of type 'factory-URLLC2'. Potential advantages of this example include that this internal mapping is more fine-grained according to the needs of the slice requirements. Additionally, it is not visible outside to the customers.

Figure 4:
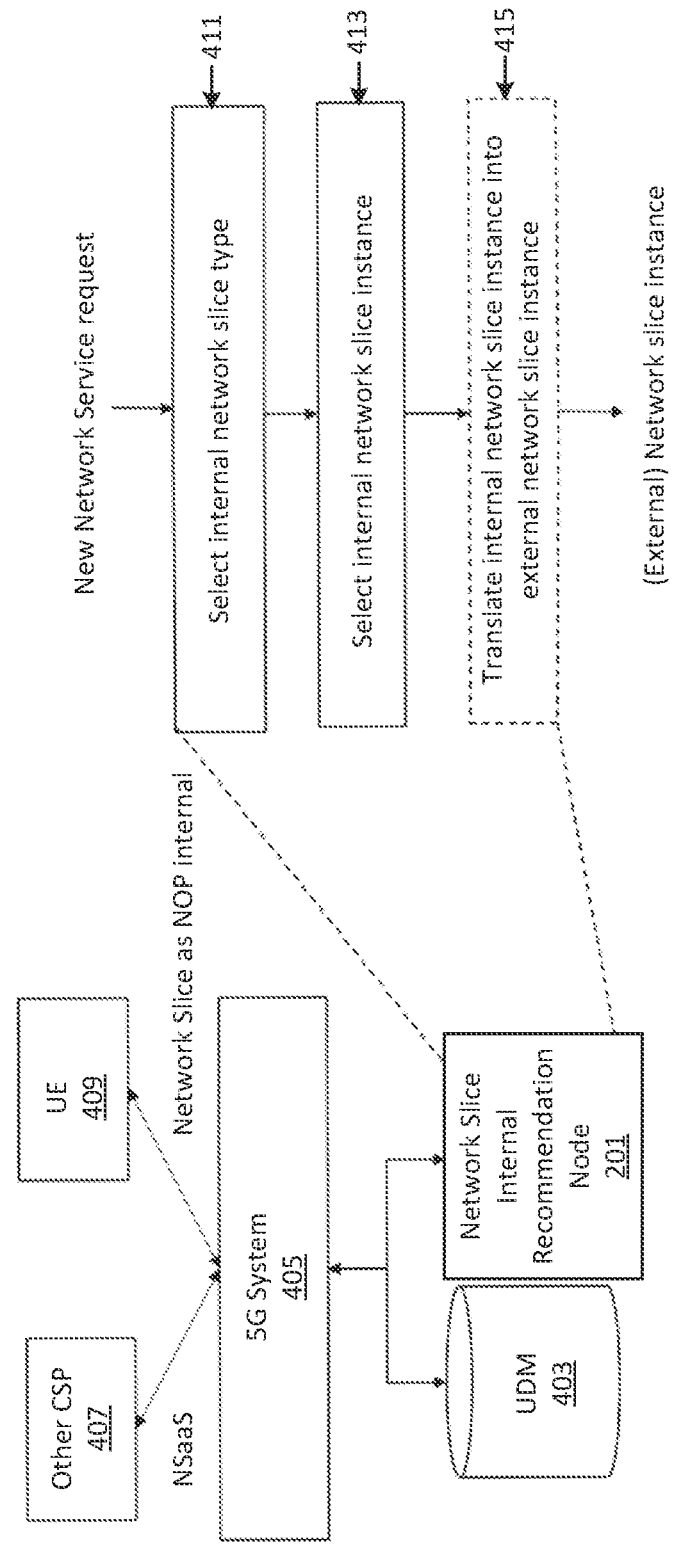
FIG. 4 is a block diagram of a system including a network slice internal recommendation node in accordance with various embodiments of the present disclosure and a flowchart of operations that are performed by the network slice internal recommendation node in accordance with various embodiments of the present disclosure.

FIG. 4 is a block diagram of a telecommunications network including a network slice internal recommendation node in accordance with various embodiments of the present disclosure and a flowchart of operations that are performed by the network slice internal recommendation node in accordance with various embodiments of the present disclosure. FIG. 4 includes several actors that interact with the network slice internal recommendation node 201, including a UDM 403, CSPs 407, and UE 409 which are communicatively connected to 5G system 405. 5G system 405 receives from a CSP 407 or UE 409 a network service request. Based on data available in UDM 403 or another node (an example of such data is illustrated in FIG. 3), network slice internal recommendation node 201 can perform three operations to obtain a mapping of network services to network slice instance.

Referring to the flowchart of operations in FIG. 4, operations that can be performed by network slice internal recommendation node 201 include three operations summarized below:

At block 411, network slice internal recommendation node 201 receives a network service request. The network service request includes at least one characteristic of the network service. For example, the at least one characteristic can include, without limitation, a SLS, a set of SLSs, a UE device type, a location of a UE, a model of a UE, a region, etc. A SLS can further include at least one characteristic of the SLS such as, for example, a security level, delay, throughput jitter, number of users, availability, redundancy, etc. Still referring to block 411, network slice internal recommendation node 201 selects a proper or appropriate internal network slice type. This selection process uses an unsupervised learning model that was previously created based on historical data. The unsupervised learning model can be, without limitation, a K-means algorithm to cluster the previous mappings available in the historical database (e.g., UDM 403) (data points) considering the characteristics of each previous network service (features). In this case, number K can be the number of internal network slice types available in a CSP 407. Alternatively, the unsupervised learning model can be created with Density-based spatial clustering of applications with noise (DBSCAN) and the number of internal network slice types would be the resulting number of clusters found in the database. Other examples of the unsupervised learning model can include, without limitation, DBSCAN, Hierarchical DBSCAN (HDBSCAN), Mixture of Gaussians, Self-organizing maps (e.g., Kohonen map), Growing Neural Gas, etc.

At block 413, based on the internal network slice type selected in the operation of block 411, network slice internal recommendation node 201 associates the network service with an internal network slice instance. The association is based on the selected network slice type corresponding to a network service with an internal network slice instance. The association may be implementation-specific and includes a spectrum of potential implementations. For example, at one end of the spectrum, there can be a one-to-one association of each network service to a newly created network slice instance. In another example, at the other end of the spectrum, network instances can be reutilized to accommodate as many network services as possible and the association can be tackled by heuristics that solve a knap-sack type of problem.

Block 415 is optional. At block 415, network slice internal recommendation node 201 abstracts the internal mapping to external network slice instances and network slice types. The operation of block 415 can be useful for hiding internal implementation details of CSPs and may allow flexibility to dynamically change the internal network slice types.

Figure 5:
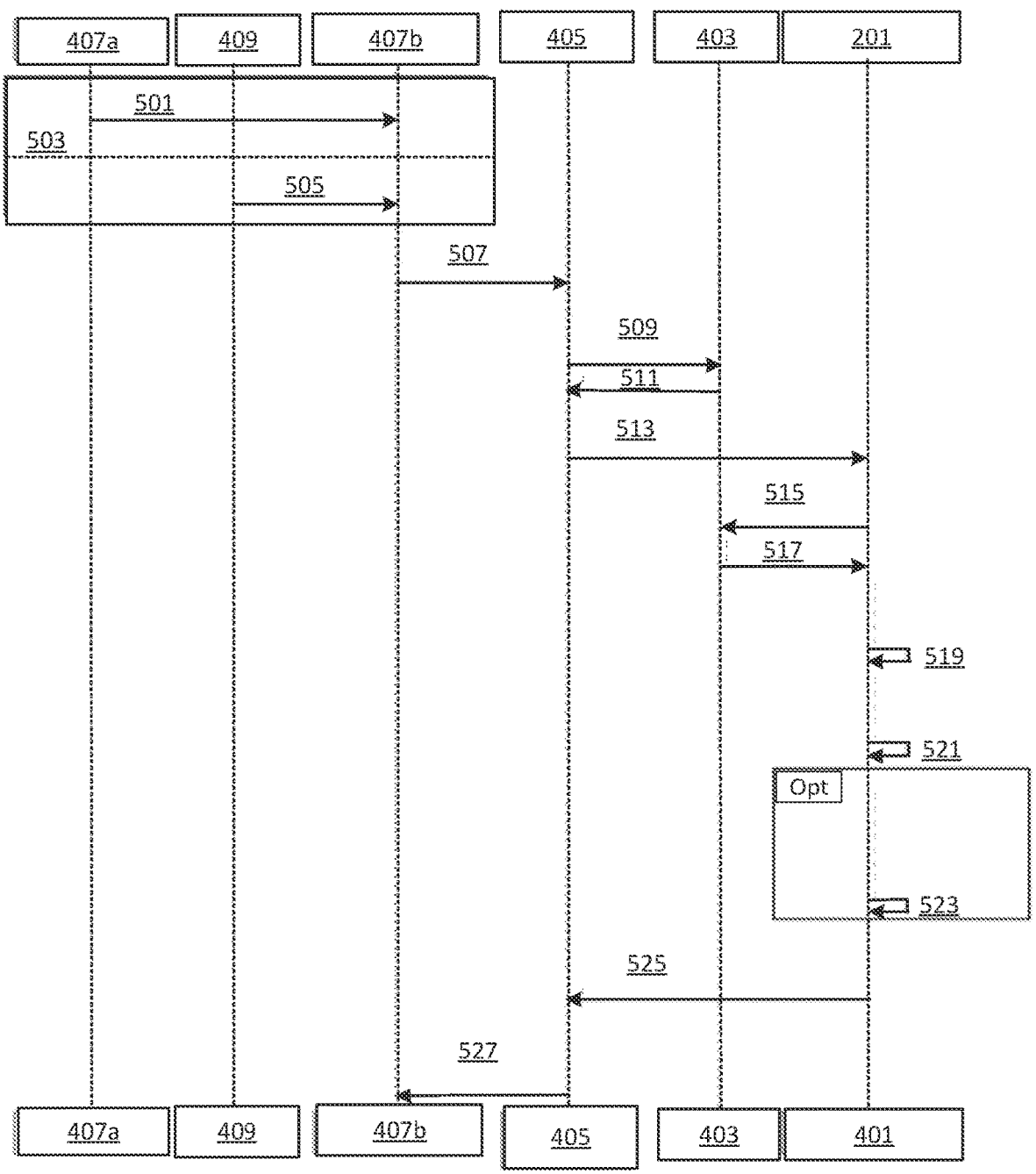
FIG. 5 is a signalling diagram of operations performed by an internal network slice recommendation node in accordance with various embodiments of the present disclosure.

FIG. 5 is a signalling diagram of operations performed by a network slice internal recommendation node (e.g., network slice internal recommendation node 201) in accordance with various embodiments of the present disclosure. Referring to FIG. 5, the signalling diagram includes three operations 519, 521, and 523 that correspond to operations 411, 413, and 415, respectively, described above with reference to FIG. 4. FIG. 5 also illustrates additional interactions among additional network nodes, including UDM 403, 5G System network slice selection function 405, CSP 407a, CSP 407b, and UE 409.

Still referring to FIG. 5, operations 501 and 503 are alternatives for signalling a communication service instance request. At operation 501, CSP 407a signals a communication service instance request with requirements via a NSaaS to CSP 407b.

Dotted line 503 represents a network slice as NOP internal. Thus, alternatively, at operation 505, UE 409 signals a communication service instance request with requirements via a network slice as NOP internal 503 to CSP 407b.

At operation 507, CSP 407b signals to 5G System network slice selection function 405 the communication service instance request augmented with context, for example UE identification.

At operation 509, 5G System network slice selection function 405 signals to UDM 403 a request for network context (e.g., network slice type, network slice instances, network load, etc.).

At operation 511, UDM 403, provides network context to 5G System network slice selection function 405.

At operation 513, 5G System network slice selection function 405 signals to network slice internal recommendation node 201 the communication service instance request augmented with network context.

At operation 515, network slice internal recommendation node 201 signals a request to UDM 403 for a current (pre-trained) network slice clustering model.

At operation 517, UDM 403 provides to network slice internal recommendation system 201 a network slice clustering model.

At operation 519, network slice internal recommendation node 201 selects an internal network slice type based on the communication service instance request requirements and the clustering model.

At operation 521, network slice internal recommendation node 201 selects an internal network slice instance based on the clustering model.

Operation 523 is optional. At operation 523, network slice internal recommendation node 201 translates the internal network slice instance into an external network slice instance based on a specific process (e.g., a knapsack problem heuristic algorithm).

At operation 525, network slice internal recommendation node 201 signals to 5G System network slice selection function 405 the external slice instance (optionally) associated with the internal network slice instance.

At operation 527, 5G System network slice selection function 405 signals to CSP 407b the external slice instance, which includes the network slice type (e.g., eMBB, URLLC, mIoT, V2X, etc.).

Figure 6:
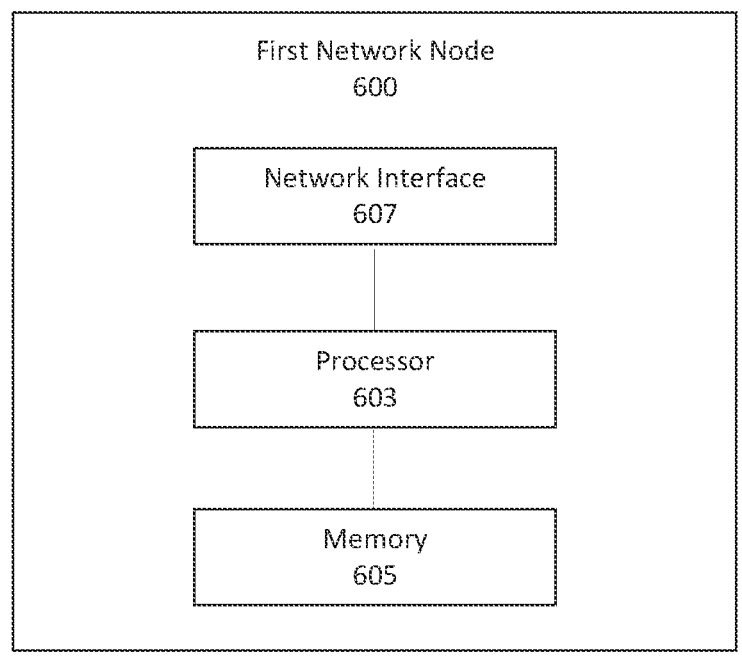
FIG. 6 is a block diagram of elements of a first network node in accordance with various embodiments of the present disclosure.

FIG. 6 is a block diagram illustrating a first network node 600 (e.g., network slice internal recommendation node 201 in FIG. 4) for a telecommunications network configured to provide network slice internal mapping according to embodiments of inventive concepts. The first network node 600 includes network interface 607 (e.g., wired network interface and/or wireless network interface) configured to communicate with other nodes of the telecommunications network. The first network node also includes a processor circuit 603 (also referred to as a processor), coupled to the network interface 607, and a memory circuit 605 (also referred to as memory) coupled to the processor 603. The memory 605 stores computer readable program code that when executed by the processor 603 causes the processor 603 to perform operations according to embodiments disclosed herein. According to other embodiments, processor 603 may be defined to include memory so that a separate memory is not required.

These and other related operations will now be described in the context of the operational flowchart of FIG. 7 that are performed by a first network node. Each of the operations described in FIG. 7 can be combined and/or omitted in any combination with each other, and it is contemplated that all such combinations fall within the spirit and scope of this disclosure. For example, some operations of FIG. 7 may be optional or omitted (e.g., operations 705-709 may be omitted).

Figure 7:
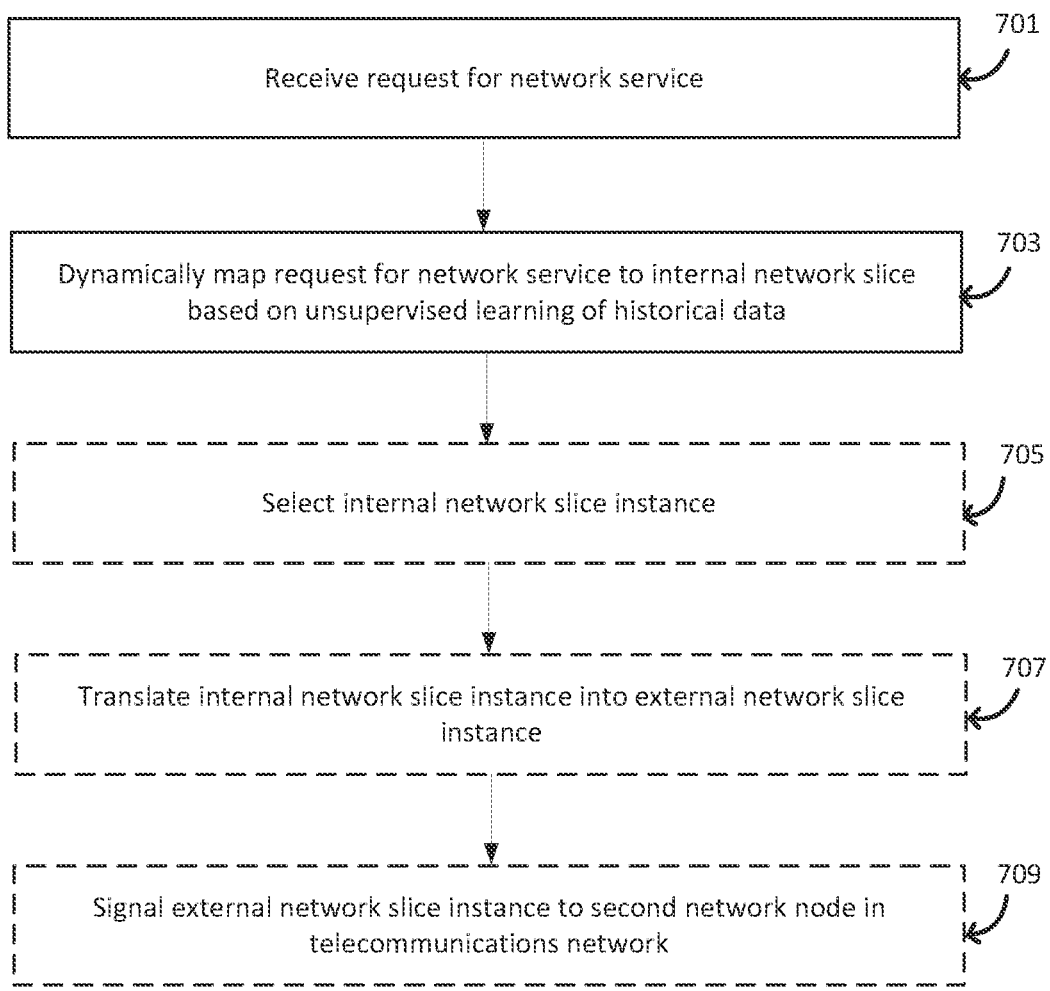
FIG. 7 is a flowchart of operations that are performed by a first network node in accordance with various embodiments of the present disclosure.

Referring to FIG. 7, operations are performed by a first network node (e.g., network slice internal recommendation node 201 in FIG. 2, implemented using the structure of 600 in FIG. 6) in a telecommunications network.

In various embodiments, operations that are performed by the first network node can include receiving 701 a request for a network service. The operations further include dynamically mapping 703 the request for the network service to an internal network slice instance based on unsupervised learning of historical data.

In some embodiments, the request for the network service includes at least one characteristic of the network service. The at least one characteristic includes at least one of a service level specification, a set of service level specifications, a communication device type, a number of communication devices, a location of a communication device, a model of a communication device, and a region.

In some embodiments, the service level specification includes at least one characteristic. The at least one characteristic includes at least one of a security level, a delay, a throughput jitter, a number of users, an availability, and a redundancy.

In some embodiments, the historical data includes a plurality of associations between a plurality of previous network services and a plurality of previous network slice instances.

In some embodiments, the unsupervised learning of historical data includes clustering the historical data into a plurality of groups. Each group associates a previous network service with a previous network slice instance.

In some embodiments, the clustering includes clustering the plurality of groups based on the characteristics of each of the plurality of previous network services and an associated previous network slice instance for each of the plurality of previous network services.

In some embodiments, the unsupervised learning includes identifying a number of internal network slice types that correspond to a number of the plurality of groups in the clustering.

In some embodiments, the clustering includes at least one of: clustering the historical data based on at least one of the characteristics of the previous network service and clustering the historical data based on at least one of a service level specification associated with the previous network service.

In some embodiments, the dynamically mapping includes selecting the internal network slice type based on the request for the network service and the historical data; and dynamically associating the internal slice type to the internal network slice instance.

In some embodiments, the selecting the internal network slice type based on the request for the network service and the historical data includes selecting the internal network slice type based on the characteristics of the network service and the clustering.

In some embodiments, wherein the dynamically mapping includes at least one of: a one-to-one association of the network service to the internal network slice instance and an association of a plurality of previous network services to a plurality of internal network slice instances.

In some embodiments, further operations that are performed by the first network node (e.g., 201) include selecting 705 the internal network slice instance.

In some embodiments, further operations that are performed by the first network node (e.g., 201) include translating 707 the internal network slice instance into an external network slice instance. The translating hides the internal slice instance from external exposure.

In some embodiments, further operations that are performed by the first network node (e.g., 201) include signalling 709 the external network slice instance to a second network node in the telecommunications network.

In various embodiments of the present disclosure, a method to map requirements for communication service instance to an appropriate network slice according to SLSs is provided. The mapping is performed by a network slice internal recommendation node. The network slice internal recommendation node is based on historical data to derive an unsupervised learning model that allows agile and dynamic association between requirements and network slices.

The unsupervised learning model can be a clustering model using data from a previous association(s) between network services requirements and network slices. Training of the unsupervised learning model can be based on data sets manually created by field experts and can evolve over time.

In some embodiments of the present disclosure, a method performed by a first network node is provided that includes three operations (as described in more detail above with reference to FIGS. 4 and 5). A first operation includes finding an appropriate internal network slice type based on unsupervised learning of historical data (e.g., a clustering model). A second operation includes mapping the internal network slice type to an internal network slice instance (e.g., this may be implementation specific and depend on the business of a CSP). A third operation includes, optionally, performing a translation for hiding the internal details of the network slice mapping. The third operation may be useful to preserve the network slice internal recommendation node mechanisms.

In some embodiments, the network slice internal recommendation node is part of the 5G management system. The network slice internal recommendation node can communicate with network node functions such as UDM and NSSF. The network slice internal recommendation node can be part of NSSF or can be implemented as a separate network node.

In some embodiments, the network slice internal recommendation node can be used for the two different business models envisioned by 3GPP, namely NSaaS and Network Slice as NOP internals as described above, for example with reference to FIG. 5.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

Claims are provided below. Reference numbers/letters are provided in parenthesis by way of example/illustration without limiting example embodiments to particular elements indicated by reference numbers/letters.

The invention claimed is:

1. A method performed by a first network node for a telecommunications network, the method comprising:
   receiving a request for a network service; and
   dynamically mapping the request for the network service to an internal network slice instance based on unsupervised learning of historical data, wherein the unsupervised learning of historical data comprises clustering the historical data into a plurality of groups, wherein each group associates a previous network service with a previous network slice instance, wherein the clustering comprises at least one of:
   clustering the plurality of groups based on a characteristic of each of the previous network service and an associated previous network slice instance for each of the previous network service,
   clustering the historical data based on at least one of the characteristics of the previous network service, and
   clustering the historical data based on at least one of a service level specification associated with the previous network service.

2. The method of claim 1, wherein the request for the network service comprises at least one characteristic of the network service, wherein the at least one characteristic comprises at least one of a service level specification, a set of service level specifications, a communication device type, a number of communication devices, a location of a communication device, a model of a communication device, and a region.

3. The method of claim 2, wherein the service level specification comprises at least one characteristic, wherein the at least one characteristic comprises at least one of a security level, a delay, a throughput jitter, a number of users, an availability, and a redundancy.

4. The method of claim 1, wherein the historical data comprises a plurality of associations between a plurality of previous network services and a plurality of previous network slice instances.

5. The method of claim 1, wherein the unsupervised learning comprises identifying a number of internal network slice types that correspond to a number of the plurality of groups in the clustering.

6. The method of claim 1, wherein the dynamically mapping comprises:
   selecting an internal network slice type based on the request for the network service and the historical data; and
   dynamically associating the internal network slice type to the internal network slice instance.

7. The method of claim 6, wherein the selecting the internal network slice type based on the request for the network service and the historical data comprises selecting the internal network slice type based on the characteristic of the network service and the clustering.

8. The method of claim 6, wherein the dynamically associating comprises at least one of: a one-to-one association of the network service to the internal network slice instance and an association of a plurality of previous network services to a plurality of internal network slice instances.

9. The method of claim 1, further comprising:
   selecting an internal network slice instance.

10. The method of claim 9, further comprising:
    translating the internal network slice instance into an external network slice instance, wherein the translating hides the internal slice instance from external exposure.

11. The method of claim 10, further comprising:
    signaling the external network slice instance to a second network node in the telecommunications network.

12. A first network node for a telecommunications network, the first network node comprising:
    at least one processor;
    at least one memory connected to the at least one processor and storing program code that is executed by the at least one processor to perform operations comprising:
    receiving a request for a network service; and
    dynamically mapping the request for the network service to an internal network slice instance based on unsupervised learning of historical data, wherein the unsupervised learning of historical data comprises clustering the historical data into a plurality of groups, wherein each group associates a previous network service with a previous network slice instance, wherein the clustering comprises at least one of:
    clustering the plurality of groups based on a characteristic of each of the previous network service and an associated previous network slice instance for each of the previous network service,
    clustering the historical data based on at least one of the characteristics of the previous network service, and
    clustering the historical data based on at least one of a service level specification associated with the previous network service.

13. A first network node for a telecommunications network adapted to perform operations comprising:

receiving a request for a network service; and dynamically mapping the request for the network service to an internal network slice instance based on unsupervised learning of historical data, wherein the unsupervised learning of historical data comprises clustering the historical data into a plurality of groups, wherein each group associates a previous network service with a previous network slice instance, wherein the clustering comprises at least one of:

clustering the plurality of groups based on a characteristic of each of the previous network service and an associated previous network slice instance for each of the previous network service, clustering the historical data based on at least one of the characteristics of the previous network service, and clustering the historical data based on at least one of a service level specification associated with the previous network service.

14. The first network node of claim 13 wherein the request for the network service comprises at least one characteristic of the network service, wherein the at least one characteristic comprises at least one of a service level specification, a set of service level specifications, a communication device type, a number of communication devices, a location of a communication device, a model of a communication device, and a region.

15. A computer program product comprising a non-transitory storage medium including program code to be executed by processing circuitry of a first network node, whereby execution of the program code causes the first network node to perform operations comprising:

receiving a request for a network service; and dynamically mapping the request for the network service to an internal network slice instance based on unsupervised learning of historical data, wherein the unsupervised learning of historical data comprises clustering the historical data into a plurality of groups, wherein each group associates a previous network service with a previous network slice instance, wherein the clustering comprises at least one of:

clustering the plurality of groups based on a characteristic of each of the previous network service and an associated previous network slice instance for each of the previous network service, clustering the historical data based on at least one of the characteristics of the previous network service, and clustering the historical data based on at least one of a service level specification associated with the previous network service.

16. The computer program product of claim 15 wherein the request for the network service comprises at least one characteristic of the network service, wherein the at least one characteristic comprises at least one of a service level specification, a set of service level specifications, a communication device type, a number of communication devices, a location of a communication device, a model of a communication device, and a region.

17. The computer program product of claim 16, wherein the service level specification comprises at least one characteristic, wherein the at least one characteristic comprises at least one of a security level, a delay, a throughput jitter, a number of users, an availability, and a redundancy.

* * * * *